United States Patent

Min et al.

[11] Patent Number: 5,968,414
[45] Date of Patent: Oct. 19, 1999

[54] SIDE CHAIN LIQUID CRYSTAL POLYMER, MANUFACTURING METHOD THEREFOR AND OPTICAL RECORDING MEDIUM EMPLOYING THE SAME

[75] Inventors: Kyung-sun Min, Yongin; Young-jae Huh, Sungnam; Tai-young Nam, Suwon, all of Rep. of Korea

[73] Assignee: Samsung Electronics Co., Ltd., Suwon, Rep. of Korea

[21] Appl. No.: 08/972,147

[22] Filed: Nov. 17, 1997

[51] Int. Cl.[6] .............................. C09K 19/12; B32B 3/02; G02F 1/13
[52] U.S. Cl. .................. 252/299.66; 252/299.01; 428/1; 428/64.2; 428/64.4
[58] Field of Search .................. 252/299.01, 299.66; 428/1, 64.4, 64.2

[56] References Cited

U.S. PATENT DOCUMENTS

| | | | |
|---|---|---|---|
| 4,904,066 | 2/1990 | Gray et al. | 252/299.01 |
| 5,019,476 | 5/1991 | Kanno et al. | 430/20 |
| 5,187,248 | 2/1993 | Etzbach et al. | 526/243 |
| 5,212,027 | 5/1993 | Eetzbach et al. | 430/20 |
| 5,259,987 | 11/1993 | McArdle et al. | 252/299.01 |
| 5,339,306 | 8/1994 | Yoshinaga et al. | 369/275.1 |

Primary Examiner—Shean C. Wu
Attorney, Agent, or Firm—Burns, Doane, Swecker & Mathis, L.L.P.

[57] ABSTRACT

A side chain liquid crystal polymer and a manufacturing method therefor are provided. Also, an optical recording medium of which recording layer is made of the side chain liquid crystal of the present invention is provided. The side chain liquid crystal polymer expressed by the following formula (V) has excellent processing properties due to its high solubility. Also, due to its high glass transition temperature and low polydispersity, information recorded on a recording layer made of the polymer can be preserved for a long time. In addition, since the recorded type (pit) is even, the error rate is low and the occurrence of jitter noise can be remarkably reduced:

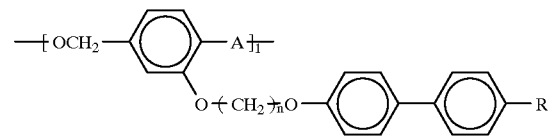

(V)

where A is either $CH_2$ or $CH_2-O-(CH_2)_m$, R is either $OCH_3$, CN or $NO_2$, l is 10 to 100, m is 1 to 6, and n is to 20.

21 Claims, 4 Drawing Sheets

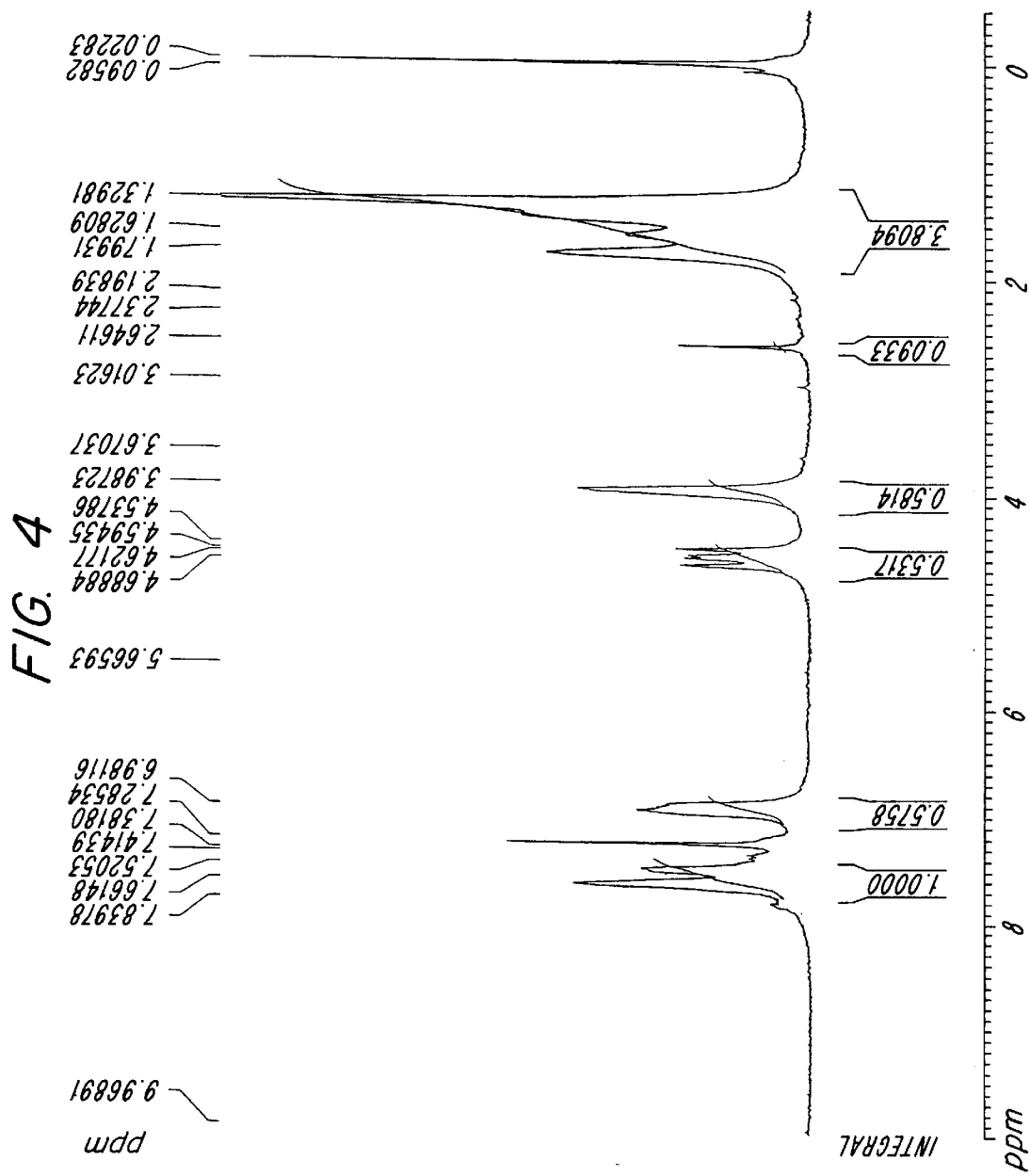

SIDE CHAIN LIQUID CRYSTAL POLYMER, MANUFACTURING METHOD THEREFOR AND OPTICAL RECORDING MEDIUM EMPLOYING THE SAME

BACKGROUND OF THE INVENTION

The present invention relates to a side chain liquid crystal polymer, a manufacturing method therefor and an optical recording medium employing the same, and more particularly, to a side chain liquid crystal polymer which is easy to be formed into a recording layer of an optical recording medium due to its excellent solubility, and when used for a recording layer of the optical recording medium, can store the recorded information for a long time, a manufacturing method therefor and an optical recording medium employing the same.

A worldwide information explosion has required high density and high capacity recording media as well as recording media capable of high speed recording. Therefore, a new recording method, using an optical recording medium, has been introduced.

However, according to the magneto-optic recording method, the magnetization direction is orthogonal to the surface of a recording layer, and thus it is difficult to change the magnetization direction, in contrast to using a magnetic substance for a magnetic recording medium. Generally, the magnetization direction is changed by an external magnetic field while the recording layer of the optical recording medium is heated to the curie temperature or more by focusing laser beams to a spot size of 1 $\mu$m, Also, the information is recorded according to the changed magnetization direction.

In the magneto-optic recording method, an information recording unit is small, at a level of 1 $\mu$m or less, so that the recording density can be increased by 10~1,000 times that of the magnetic recording method. Also, since the recording and playback are performed in a non-contact manner, it is easy to store information and the life time is also increased.

However, such optical recording media has a recording layer which is formed of a heavy metal, and is manufactured by a complicated process such as sputtering or vacuum deposition. To solve these problems, research into the development of an organic optical recording medium has been conducted.

The organic optical recording medium is classified as one of two according to being erasable or not: a write once read many (WORM) type which allows only reading after writing once and a rewritable (RW) type which is erasable after writing.

The WORM type is manufactured by the steps of: forming a recording layer by coating a mixture of dyes for absorbing laser beams on a substrate, and forming a reflective layer and a protective layer on the formed recording layer. If the laser beams are irradiated on the recording layer of such recording medium, the dye of the recording layer absorbs the laser beam to generate heat, and the dye is then decomposed by the generated heat to form a pit. As a result, the recording is made. Meanwhile, the playback of the information is performed based on the difference of reflectivity between a portion with pits and another portion without pits.

For manufacturing the RW type optical recording medium, there is a method using a thermoplastic resin and a dye for absorbing near infra-red rays, and a method using a polymer blend. However, according to these methods, a recording sensitivity and a recording/erasing repeatability are both poor.

FIG. 1 shows a layer structure of a organic optical recording medium of RW type. The optical recording medium of FIG. 1 includes a substrate 1, a conductive layer 2, a recording layer 3, a reflective layer 4 and a protective layer 5.

Among those, the recording layer has a side chain liquid crystal polymer as a major component. The side chain liquid crystal polymer is roughly composed of a main chain, a spacer and a mesogen group, and provides the fluidity of a liquid and the optical anisotropy of a solid crystal. The optical recording medium adopting such side chain LCP records information by the following methods.

First, there is a method using a difference of optical characteristics such as transmittance and absorbency, which are determined according to the difference in alignment of the mesogen groups before and after the heating (recording) by the laser beams. In an optical recording medium adopting this method, the liquid crystals are aligned according to the applied electric field or magnetic field, or thermal treatment.

Second, there is a method using a difference of absorption spectrum which changes according to the interaction between the mesogen group and a chromophore before and after the heating (recording) by the laser beams.

In order to use the liquid crystal in a recording medium, there are required a high contrast between before and after recording, a long storage time, and easy of application to a substrate. However, the conventional liquid crystal polymers for an optical recording medium are inadequate in meeting one or more of the above requirements.

U.S. Pat. Nos. 4,904,066 and 5,259,987 disclose an optical recording medium using a liquid crystal polymer expressed by the following formula (I). The liquid crystal polymer can be dissolved in a general organic solvent, and thus easily spin coated on the substrate to form a recording layer. However, the glass transition temperature of the polymer is 25° C. or less, so that the alignment of the liquid crystals is easily changed, resulting in inferior information storing property, even though the information is easily recorded.

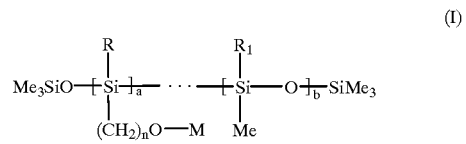

(I)

U.S. Pat. No. 5,339,306 discloses an optical recording medium using a main chain polyester liquid crystal polymer and a main chain acrylate liquid crystal polymer, which are expressed by the following formulae (II) and (III), respectively. The main chain liquid crystal polymer dissolves only in a limited kind of an organic solvent such as trichlorobenzene or o-chlorophenol, so the coating property is not good. Also, the side chain acrylate liquid crystal polymer has a good solubility, but a glass transition temperature thereof is 50° C. or less, so that it is difficult to store the recorded information for a long time.

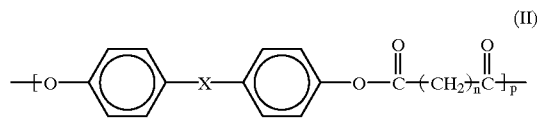

(II)

-continued

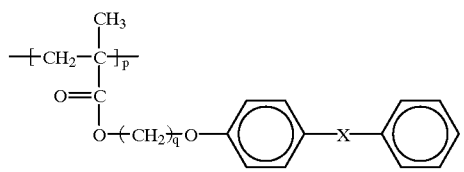
(III)

U.S. Pat. Nos. 5,212,027 and 5,187,248 disclose an optical recording media capable of repetitive recording and erasing, which use an acrylate ferroelectric smectic liquid crystal polymer expressed by the following formula (IV). However, the glass transition temperature of the polymer is low, so the information storing property is inferior.

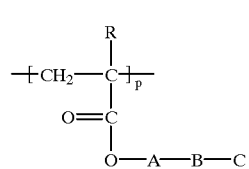
(IV)

U.S. Pat. No. 5,019,476 discloses an optical recording medium using a side chain polypeptide liquid crystal polymer. However, this polymer dissolves only in a limited kind of an organic solvent such as chloroform and dichloroethane, so that the polymer can be coated only on an epoxy resin or a glass substrate. That is, it is impossible to apply the polymer to a polycarbonate substrate which has been widely used for an optical disk.

SUMMARY OF THE INVENTION

To solve the above problems, it is an object of the present invention to provide a side chain liquid crystal polymer which has a good solubility in organic solvent, and a high glass transition temperature.

It is another object of the present invention to provide a method for manufacturing the above side chain liquid crystal polymer.

It is still another object of the present invention to provide an optical recording medium of which recording layer comprises the above side chain liquid crystal polymer.

To achieve the first object, there is provided a side chain liquid crystal polymer expressed by the following formula (V):

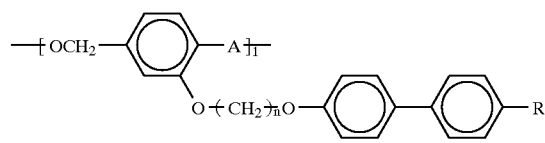
(V)

where A is $CH_2$ or $CH_2-O-(CH_2)_m$, R is $OCH_3$, CN or $NO_2$, l is 10 to 100, m is 1 to 6, and n is 1 to 20.

To achieve the second object, there is provided a method for manufacturing a side chain liquid crystal polymer expressed by the following formula (V) comprising a reaction of a monomer compound expressed by the following formula (XI) and a compound expressed by the following formula (XIV).

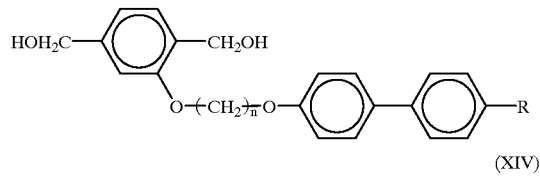
(XI)

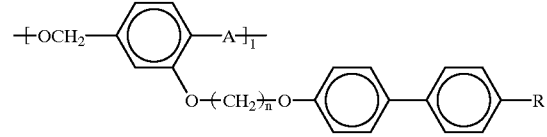
(XIV)

where A is $CH_2$ or $CH_2-O-(CH_2)_m$, R is $OCH_3$, CN or $NO_2$, l is 10 to 100, m is 1 to 6, and n is 1 to 20.

To achieve the second object, there is also provided a method for manufacturing a side chain liquid crystal polymer expressed by the following formula (V) comprising a reaction of monomer compounds expressed by the following formula (XI) and (XIII).

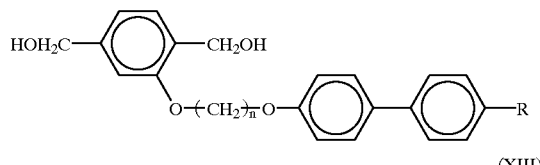
(XI)

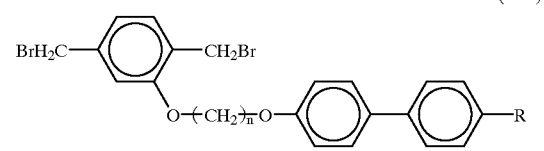
(XIII)

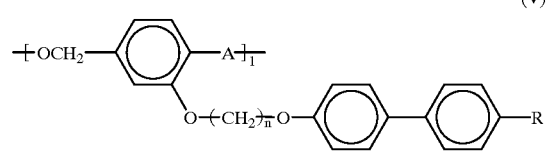
(V)

where A is $CH_2$ or $CH_2-O-(CH_2)_m$, R is $OCH_3$, CN or $NO_2$, l is 10 to 100, m is 1 to 6, and n is 1 to 20.

To achieve the second object, there is also provided a method for manufacturing a side chain liquid crystal polymer expressed by the following formula (V) comprising a reaction of a monomer compound expressed by the following formula (XIII) and a compound expressed by the following formula (XV).

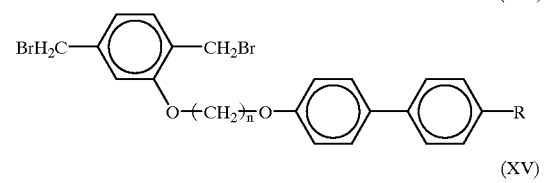
(XIII)

(XV)

-continued

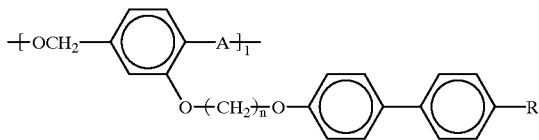

(V)

where A is $CH_2$ or $CH_2$—O—$(CH_2)_m$, R is $OCH_3$, CN or $NO_2$, l is 10 to 100, m is 1 to 6, and n is 1 to 20.

To achieve the third object, there is provided an optical recording medium in which a conductive layer, a recording layer, a reflective layer and a protective layer are sequentially formed on a transparent substrate, wherein the recording layer includes a side chain liquid crystal polymer and a dichroic dye, the side chain liquid crystal polymer expressed by the following formula (V):

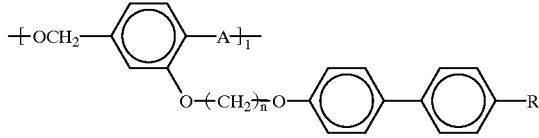

(V)

where A is $CH_2$ or $CH_2$—O—$(CH_2)_m$, R is $OCH_3$, CN or $NO_2$, l is 10 to 100, m is 1 to 6, and n is 1 to 20.

BRIEF DESCRIPTION OF THE DRAWINGS

The above objects and advantages of the present invention will become more apparent by describing in detail preferred embodiments thereof with reference to the attached drawings in which:

FIG. 4 is an NMR spectrum of a compound manufactured using the monomer shown in FIG. 2.

DETAILED DESCRIPTION OF THE INVENTION

Figure 1:
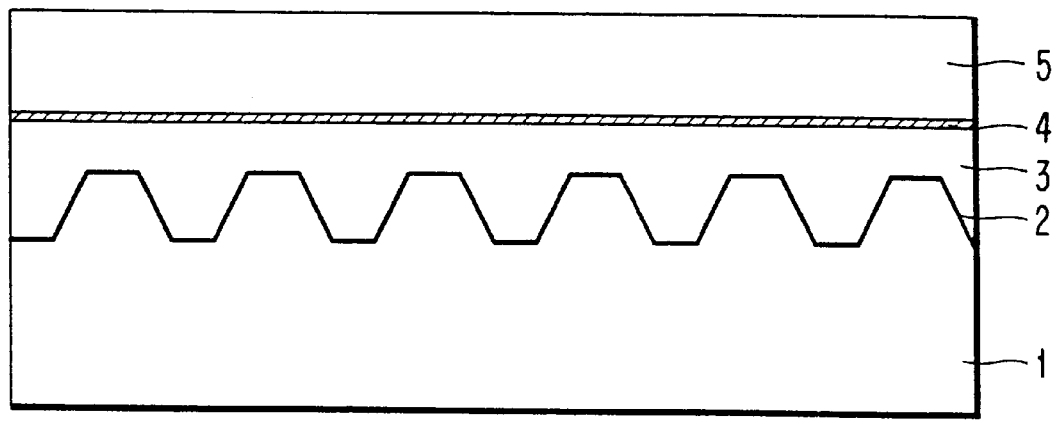
FIG. 1 is a diagram showing a RW type optical recording medium.

The present invention discloses a side chain liquid crystal polymer expressed by following formula (V), a manufacturing method thereof and an optical recording medium employing the same.

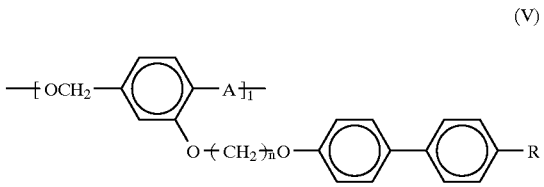

(V)

where A is $CH_2$ or $CH_2$—O—$(CH_2)_m$, R is $OCH_3$, CN or $NO_2$, l is 10 to 100, m is 1 to 6, and n is 1 to 20.

A polymer of the present invention has a p-xylene group at the main chain, so its glass transition temperature is high. As a result, relaxation of a mesogen group at a side chain thereof does not occur at the room temperature. Since the main chain also has an ether group, coating onto polycarbonate is excellent. Thus, the polymer is suitable as a material for a recording layer of an optical recording medium.

The degree of polymerization of the polymer according to the present invention is 10~100, preferably, 10~30. Also, the weight-average molecular weight thereof is 3,000~100,000, preferably, 6,000~50,000. If the weight-average molecular weight is less than 3,000, it is difficult to exhibit peculiar characteristics of polymer. On the other hand, if the weight-average molecular weight exceeds 100,000, the solubility of the polymer is low, so the polymer cannot be applied to the optical recording medium.

Also, the polydispersity of the polymer according to the present invention is 20 or less. If the polydispersity is higher than 20, the error rate is high due to the uneven recorded type (pit) and jitter which mean the irregularity of signals frequently occurs when information is recorded on a recording layer of an optical recording medium made of the polymer.

An optical recording medium of the present invention, adopting the polymer, may be manufactured by a general method. That is, conductive layer, recording layer, reflective layer and protective layer are formed on a substrate in sequence.

In the present invention, the recording layer may be formed by a general method, except that the liquid crystal polymer synthesized by the present invention is used. For example, a dichroic dye and a side chain liquid crystal polymer are dissolved in an organic solvent, and the resultant solution is then spin-coated on the conductive layer, resulting in the recording layer. Here, any general dichroic dye may be used without restriction. However, more preferably, chroconium-based dye, azo-based dye or quinone-based dye can be used as a dichroic dye. Also, preferably, the side chain polymer and the dichroic dye are mixed in the ratio of 99.5:0.5–80.0:20.0 based on weight.

Hereinafter, the present invention will be described in detail through the synthesing process of the polymer.

Synthesis of Monomer (XI)

Equal mole amounts of the compounds expressed by the following formulas (VI) and (VII) are dissolved in an organic solvent. Then, calcium carbonate is added to the solution and reacted under reflux to obtain a compound expressed by the following formula (VIII). Here, methylenechloride, methanol, ethanol, propanol, etc. can be used as the organic solvent.

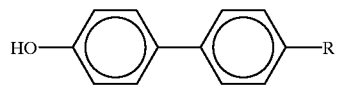

(VI)

(VII)

(VIII)

After dissolving the compound expressed by the formula (VIII) and tosylchloride in butanol, chloroform or tetrahydrofuran with the same molar ratio, the resultant solution is heated to obtain a compound expressed by the following formula (IX).

(IX)

Equal mole amounts of the compound expressed by the formula (IX) and hydroxydimethylterephthalate are dissolved in an organic solvent, and potassium carbonate is added to the solution, and then the resultant solution is reacted at 25~60° C. to obtain the compound expressed by the following formula (X).

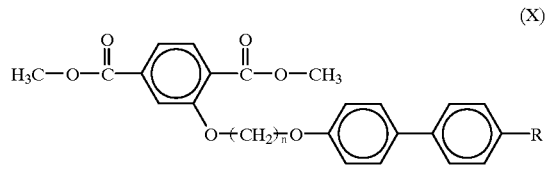
(X)

Lastly, the compound expressed by the formula (X) is dissolved in an organic solvent, and Ca(BH$_4$)$_2$ as a reducing agent is added to the solution. Then, the resultant solution is reacted, resulting in a monomer expressed by the following formula (XI).

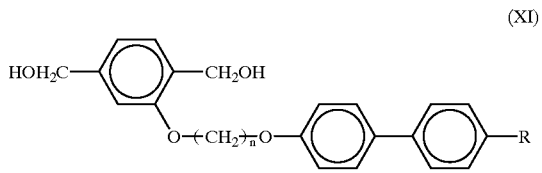
(XI)

Synthesis of Monomer (XIII)

Equal mole amounts of the compound expressed by the formula (IX) and hydroxy-2,5-dimethylbenzene are dissolved in an organic solvent, and calcium carbonate is then added to the solution. Then, the resultant solution is reacted under reflux to obtain a compound expressed by the following formula (XII). Here, alcohol such as ethanol and methanol can be used as the organic solvent.

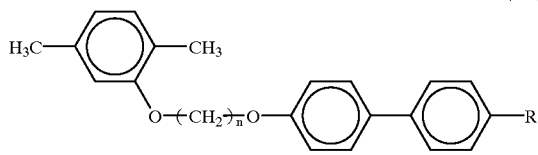
(XII)

Lastly, the compound expressed by the formula (XII) is dissolved in acetone, and the solution is then bromized using N-bromosuccinimide (NBS) in the presence of benzylperoxide (BPO), resulting in a monomer expressed by the following formula (XIII). Here, it is preferred that 2.5 mole or more of NBS is added with respect to 1 mole of the compound represented by (XII).

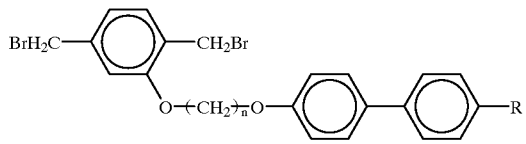
(XIII)

Synthesis of Polymer (V)

The compound expressed by the formula (XIII) or a dibromoalkane expressed by the following formula (XIV), and the monomer expressed by the formula (XI) are dissolved in an organic solvent, and then polymerized to obtain the polymer expressed by the formula (V) according to the present invention. Here, it is preferable that o-dichlorobenzene is used as the organic solvent, and the polymerization is performed under reflux in the presence of a quaternary ammonium salt such as tetrabutylammonium hydroxide or tetrabutylammonium hydroxysulfate, and sodium hydroxide.

(XIV)

Also, the polymer (V) of the present invention is also obtained by reacting the compound expressed by the formula (XIII) with a diol expressed by the following formula (XV).

(XV)

Hereinafter, the present invention will be described in detail by the following examples. However, the present invention is not limited to the following examples.

EXAMPLE 1–12

Preparation of Monomer Compound

<Example 1>

0.05M of 4-hydroxy-4'-cyanobiphenyl, 0.05M of 12-bromododecanol and 0.001M of potassium carbonate were added to 500 ml of methylenechloride, and then reacted for 12 hours under reflux. The reactant was recrystallized with methylenechloride.

The obtaining resultant was dissolved in 100 ml of butanol together with 0.06M of tosylchloride and 0.001M of triethylamine, and was heated at 50° C. for 12 hours and then cooled at −5° C. in a refrigerator. Then, the reactant was recrystallized with butanol.

0.03M of the obtained resultant and 0.03M of hydroxy-dimethylterephthalate were dissolved in ethanol, and 0.001M potassium carbonate was added to the mixture, which was then reacted at 60° C. for 12 hours. After the reaction, the resultant product was recrystallized with methanol to obtain a reaction product.

Figure 2:
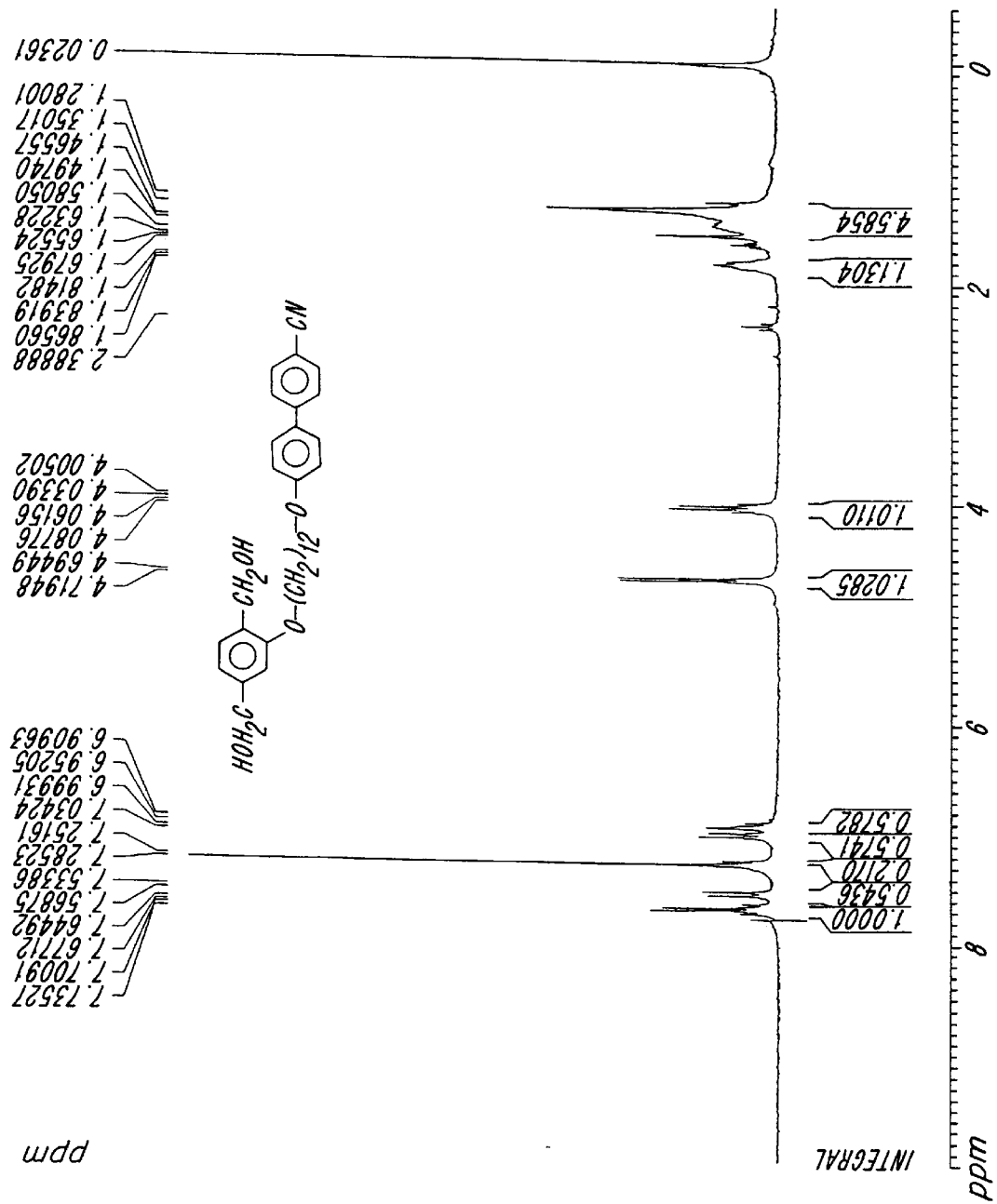
FIG. 2 is a nuclear magnetic resonance (NMR) spectrum of a monomer compound manufactured according to an example of the present invention.

0.02M of the above reaction product was dissolved again in 500 ml of methanol, and 0.01 g of Ca(BH$_4$)$_2$ was added to the solution, which was then reacted at 50° C. for 12 hours. Then, the resultant product was recrystallized with methanol to obtain a compound. The nuclear magnetic resonance (NMR) spectrum analysis (see FIG. 2) and infra red (IR) spectrum analysis (absorption peak: 2242.8 cm$^{-1}$ (—CN)) were performed for the obtained compound. As a result, the obtained compound was identified as a monomer compound expressed by the following formula (XI-1).

Atomic analysis:
Experimental value (C 77.8%, H 7.15%, N 2.81%)
Calculated value (C 77.48%, H 7.24%, N 2.74%)

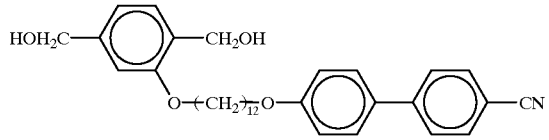

(XI-1)

<Example 2>

0.05M of 4-hydroxy-4'-cyanobiphenyl, 0.05M of 12-bromododecanol and 0.001M of potassium carbonate were dissolved in 500 ml of methylenechloride, and then reacted for 12 hours under reflux. Then, the reactant was recrystallized with methylenechloride.

The obtained resultant was dissolved in 100 ml of butanol together with 0.06M of tosylchloride and 0.001M of triethylamine, and then heated at 60° C. and cooled at −5° C. The reactant was recrystallized with butanol.

0.02M of the obtained resultant and 0.02M of hydroxy-2,5-dimethylbenzene were dissolved in 50 ml of ethanol together with 0.001M of potassium carbonate, and then reacted for 12 hours under reflux. Then, the reactant was recrystallized with methanol.

The obtained resultant was bromized using NBS in the presence of BPO to obtain a compound. According to the result of the NMR spectrum analysis for the obtained compound, a similar NMR pattern to that of Example 1 was obtained, except that a peak was not shown near 2.4 ppm (—OH). Also, from the result of the IR spectrum analysis (absorption peak: 2240 cm$^{-1}$ (—CN)), the obtained compound was identified as a monomer compound expressed by the following formula (XIII-1).

Atomic analysis:
Experimental value (C 62.5%, H 6.0%, N 2.3%, Br 25.4%)
Calculated value (C 61.8%, H 6.1%, N 2.2%, Br 24.5%)

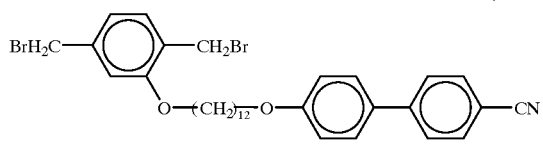

(XIII-1)

<Example 3>

A compound was produced by the same method as that of Example 1, except that 6-bromohexanol was used instead of 12-bromododecanol. According to the NMR spectrum analysis for the obtained compound, the NMR pattern is similar to that in Example 1 was obtained, and a peak-to-peak area ratio of the peak at 1.3~1.8 ppm to the peak at 4.7 ppm was 2:1. Also, according to the result of the IR spectrum, vibration of —CN was observed at 2242.8 cm$^{-1}$.

As a result, the obtained compound was identified as a monomer compound expressed by the following formula (XI-2).

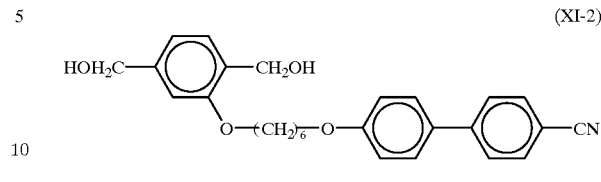

(XI-2)

<Example 4>

Figure 3:
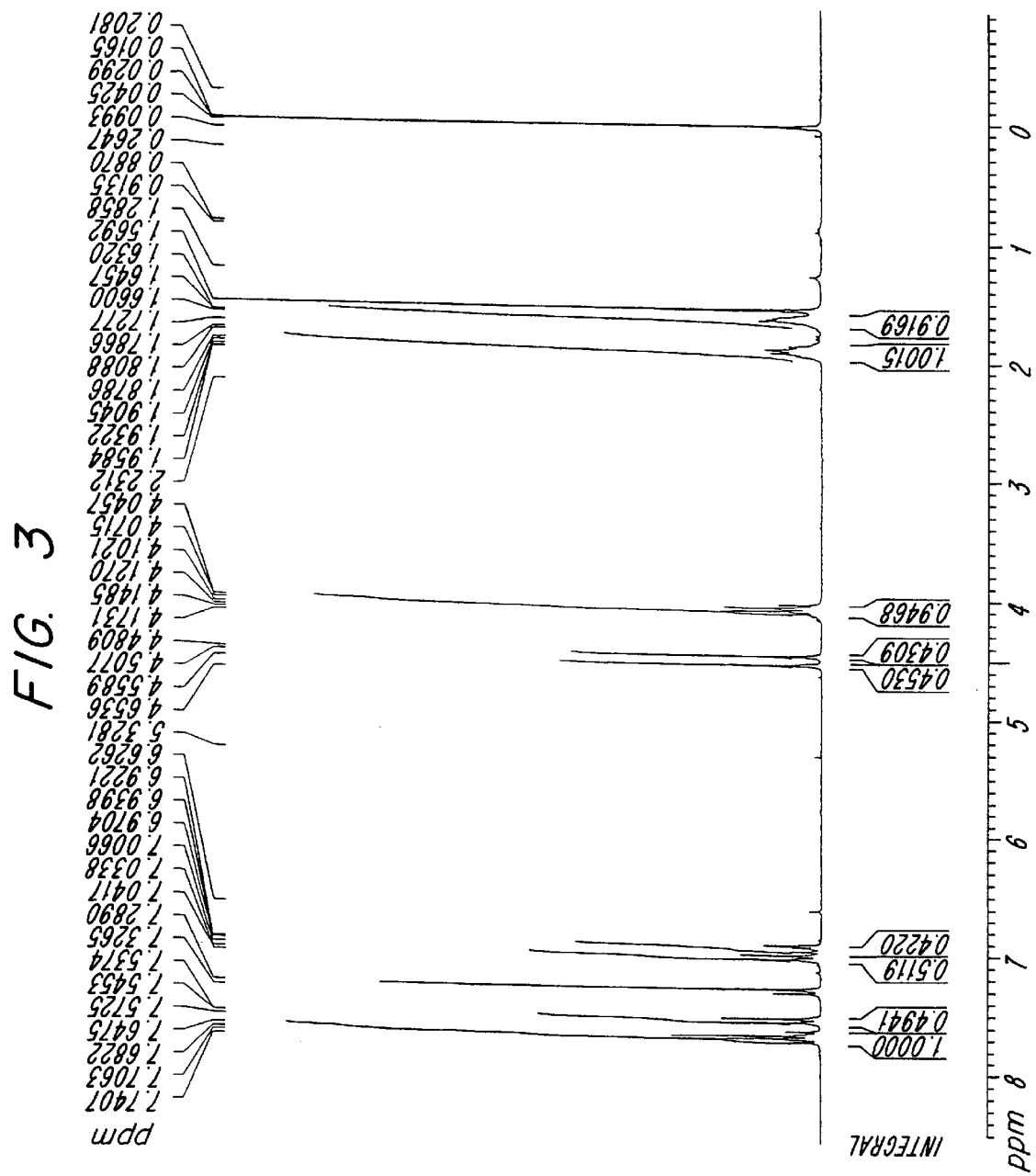
FIG. 3 is an NMR spectrum of a monomer compound manufactured according to another example of the present invention.

A compound was produced by the same method as that of Example 2, except that 6-bromohexanol was used instead of 12-bromododecanol. As a result of the NMR spectrum analysis (see FIG. 3), the obtained compound was identified as a monomer compound expressed by the following formula (XIII-2).

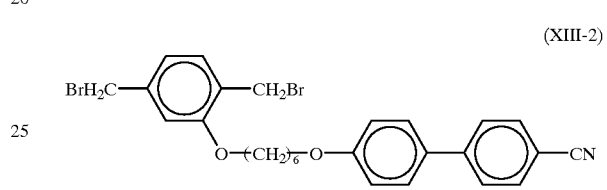

(XIII-2)

<Example 5>

0.05M of 4-hydroxy-4'-methoxybiphenyl, 0.05M of 12-bromododecanol and 0.001M of potassium carbonate were dissolved in 500 ml of methanol, and then reacted for 12 hours under reflux. Then, the reactant was recrystallized with ethanol.

The obtained resultant was dissolved in 100 ml of butanol together with 0.06M of tosylchloride and 0.001M of triethylamine, and then heated at 60° C. and cooled at −5° C. The reactant was recrystallized with butanol.

0.03M of the obtained resultant was dissolved in ethanol together with 0.03M of hydroxydimethylterephthalate, and 0.001M of potassium carbonate was added to the mixture, which was then reacted at 70° C. for 24 hours. After the reaction, the reactant was recrystallized with methanol.

0.02M of the obtained resultant was dissolved again in 500 ml of methanol, and 0.01 g of Ca(BH$_4$)$_2$ was added to the mixture and then reacted at 50° for 24 hours. Then, the reaction product was recrystallized with methanol to obtain a product. According to the result of the NMR spectrum analysis for the obtained product, a similar NMR pattern to that of Example 1 was shown, except that the peak (—OCH$_3$) at 3.37 ppm was appeared. Thus, the product was identified as a monomer compound expressed by the following formula (XI-3).

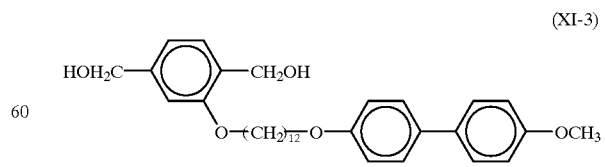

(XI-3)

<Example 6>

0.05M of 4-hydroxy-4'-methoxybiphenyl, 0.05M of 12-bromododecanol and 0.001M of potassium carbonate were dissolved in 500 ml of methanol, which was then reacted for 12 hours under reflux. Then, the reactant was recrystallized with ethanol to obtain a reaction product.

The obtained reaction product was dissolved in 100 ml of butanol together with 0.06M of tosylchloride and 0.001M of trimethylamine, and then heated and cooled. Then, the resultant product was recrystallized with butanol to obtain a reaction product.

The obtained reaction product and 0.02M of hydroxy-2,5-dimethylbenzene were dissolved in 50 ml of ethanol together with 0.001M of potassium carbonate, and then reacted for 12 hours under reflux. The reactant was recrystallized with methanol.

The obtained resultant was bromized using NBS in the presence of BPO. According to the result of the NMR spectrum for the bromized product, a similar NMR pattern to that of Example 2 was shown, except that the peak (—OCH$_3$) at 3.7 ppm was appeared. As a result, the product was identified as a monomer compound expressed by the following formula (XIII-3).

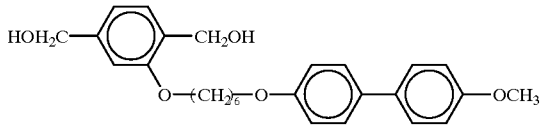

(XIII-3)

<Example 7>

A compound was produced by the same method as that of Example 5, except that 6-bromohexanol was used instead of 12-bromododecanol. According to the NMR spectrum analysis for the obtained compound, a similar NMR pattern to that of Example 5 was shown, and a peak-to-peak area ratio of the peak at 3.7 ppm to the peak at 1.3~1.9 ppm was 3:8. As a result, the reaction compound was identified as a monomer compound expressed by the following formula (XI-4).

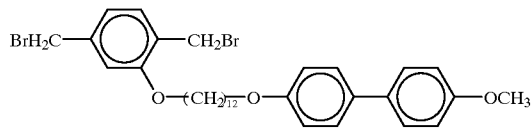

(XI-4)

<Example 8>

A compound was produced by the same method as that of Example 6, except that 6-bromohexanol was used instead of 12-bromododecanol. According to the NMR spectrum analysis for the obtained compound, a similar NMR pattern to that of Example 6 was shown, and a peak-to-peak area ratio of the peak at 3.7 ppm to the peak at 1.3~1.9 ppm was 3:8. As a result, the reaction compound was identified as a monomer compound expressed by the following formula (XIII-4).

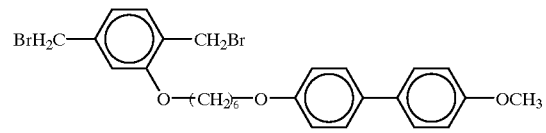

(XIII-4)

<Example 9>

0.05M of 4-hydroxy-4'-nitrobiphenyl, 0.05M of 12-bromododecanol and 0.001M of potassium carbonate were dissolved in 500 ml of methanol, and then reacted for 12 hours under reflux. Then, the reactant was recrystallized with ethanol.

The obtained resultant was dissolved in 100 ml of butanol together with 0.06M of tosylchloride and 0.001M of triethylamine, and then heated at 60° C. and cooled at −5° C. The reactant was recrystallized with butanol.

0.03M of the obtained resultant was dissolved in ethanol together with 0.03M of hydroxydimethylterephthalate, and 0.001M of potassium carbonate was added to the mixture, which was then reacted at 70° C. for 8 hours. After the reaction, the reactant was recrystallized with methanol.

0.02M of the obtained resultant was dissolved again in 500 ml of methanol, and 0.01 g of Ca(BH$_4$)$_2$ was added to the mixture, which was then reacted at 50° for 24 hours. Then, the reactant was recrystallized with methanol to obtain a product.

According to the result of the NMR spectrum analysis for the obtained product, a similar NMR pattern to that of Example 1 was shown. Also, according to the result of the IR analysis, absorption peaks at 1560 cm$^{-1}$ and 1360 cm$^{-1}$ (—NO$_2$) were observed. As a result, the reaction product was identified as a monomer compound expressed by the following formula (XI-5).

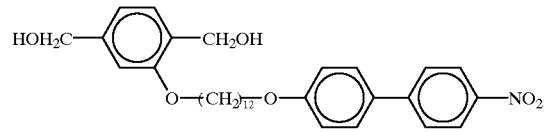

(XI-5)

<Example 10>

0.05M of 4-hydroxy-4'-nitrobiphenyl, 0.05M of 12-bromododecanol and 0.001M potassium carbonate were dissolved in 500 ml of methanol, and then reacted for 12 hours under reflux. Then, the reactant was recrystallized with ethanol.

The obtained resultant was dissolved in 100 ml of butanol together with 0.06M of tosylchloride and 0.001M of trimethylamine, and then heated at 60° C. and cooled at −5° C. Then, the reactant was recrystallized with butanol.

The obtained resultant and 0.02M of hydroxy-2,5-dimethylbenzene were dissolved in 50 ml of ethanol together with 0.001M of potassium carbonate, and then reacted for 12 hours under reflux. The reactant was recrystallized with methanol.

The obtained resultant was bromized using NBS in the presence of BPO. According to the result of the NMR spectrum analysis for the bromized product, a similar NMR pattern to that of Example 2 was shown, except for a peak at the hydrogen position of the aromatic ring. Also, according to the result of the IR spectrum, absorption peaks at 1550 cm$^{-1}$ and 1350 cm$^{-1}$ (—NO$_2$) were observed. As a result, the bromized product was identified as a monomer compound expressed by the following formula (XIII-5).

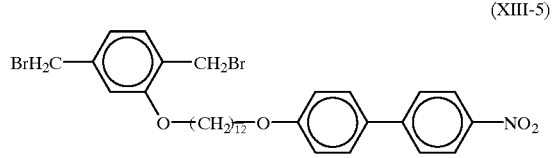

(XIII-5)

<Example 11>

A compound was produced by the same method as that of Example 9, except that 6-bromohexanol was used instead of 12-bromododecanol. According to the NMR spectrum analysis for the obtained compound, a similar NMR pattern to that of Example 3 was observed, and a peak-to-peak area ratio of the peak at 4.0 ppm to the peak at 1.3~1.9 ppm was 1:2. Also, according to the result of the IR spectrum, the same absorption peaks (—NO$_2$) as that of Example 9 was observed. As a result, the obtained compound was identified as a monomer compound expressed by the following formula (XI-6).

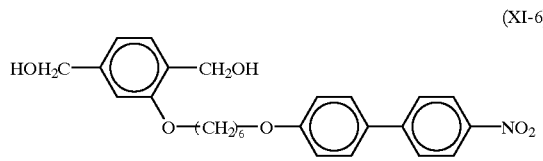

(XI-6)

<Example 12>

A compound was produced by the same method as that of Example 10, except that 6-bromohexanol was used instead of 12-bromododecanol. According to the NMR spectrum analysis for the obtained compound, a similar NMR pattern to that of Example 4 was observed, and a peak-to-peak area ratio of the peak at 4.0 ppm to the peak at 1.3~1.9 ppm was 1:2. Also, according to the result of the IR spectrum analysis, the same absorption peaks (—NO$_2$) as those of Example 10 were observed. As a result, the obtained compound was identified as a monomer compound expressed by the following formula (XIII-6).

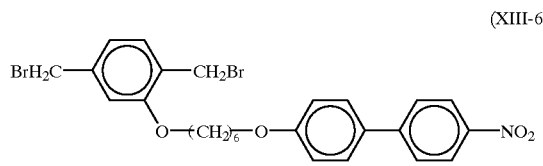

(XIII-6)

EXAMPLES 13–25

Preparation of Side Chain Liquid Crystal Polymer

<Example 13>

0.02M of the compounds (XI-1) and (XIII-1), produced by Examples 1 and 2, respectively, were dissolved in 100 ml of o-dichlorobenzene, and 200 ml of 10N sodium hydroxide solution and 0.001M tetrabutylammoniumhydroxide were added to the solution, which was then reacted for 24 hours under reflux. After extracting the reaction product, the NMR spectrum analysis and gel permeation chromatography (GPC) analysis were performed. As a result, the product was identified as a polymer expressed by the following formula (V-1), whose weight-average molecular weight (M$_W$) is 23,000 and polydispersity (M$_W$/M$_n$) is 2.7.

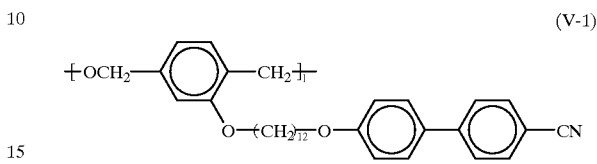

(V-1)

<Example 14>

A polymer was synthesized by the same method as Example 13, except that the compounds (XI-2) and (XIII-2), produced by Examples 3 and 4, respectively, were used. According to the result of the GPC analysis for the synthesized polymer, it was identified as a polymer expressed by the following formula (V-2), whose weight-average molecular weight (M$_W$) is 32,000 and polydispersity (M$_W$/M$_n$) is 2.7.

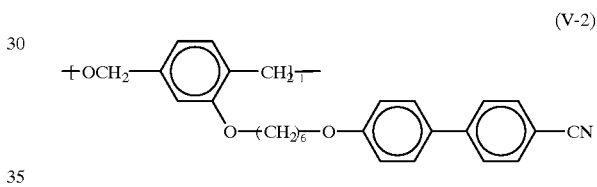

(V-2)

<Example 15>

0.02M of the compounds (XI-3) and (XIII-3), produced by Examples 5 and 6, respectively, were dissolved in 100 ml of o-dichlorobenzene, and 200 ml of 10N sodium hydroxide solution and 0.001M tetrabutylammoniumhydroxysulfate were added to the solution, and which was then reacted for 24 hours under reflux. After extracting the reaction product, the GPC analysis was performed. As a result, the reaction product was identified as a polymer expressed by the following formula (V-3), whose weight-average molecular weight (M$_W$) is 32,000 and polydispersity (M$_W$/M$_n$) is 8.5.

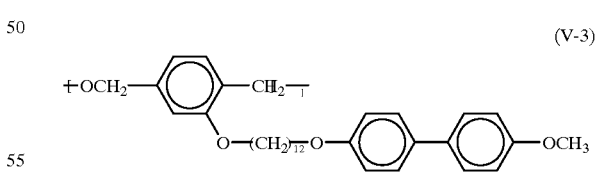

(V-3)

<Example 16>

A polymer was synthesized by the same method as Example 15, except that the compounds (XI-4) and (XIII-4), produced by Examples 7 and 8, respectively, were used. According to the result of the GPC analysis for the synthesized polymer, the product was identified as a polymer expressed by the following formula (V-4), whose weight-average molecular weight (M$_W$) is 25,000 and polydispersity (M$_W$/M$_n$) is 3.1.

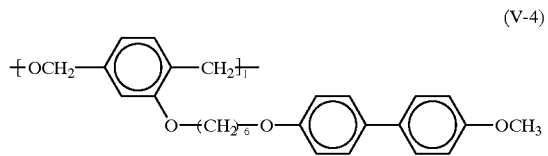

(V-4)

<Example 17>

0.02M of the compounds (XI-5) and (XIII-5), produced by Examples 9 and 10, respectively, were dissolved in 100 ml of o-dichlorobenzene, and 200 ml of 10N sodium hydroxide solution and 0.001M tetrabutylammoniumhydroxysulfate were added to the solution, and which was then reacted for 24 hours under reflux. After extracting the resultant product, the GPC analysis was performed. As a result, the product was identified as a polymer expressed by the following formula (V-5), whose weight-average molecular weight ($M_w$) is 37,000 and polydispersity ($M_w/M_n$) is 3.5.

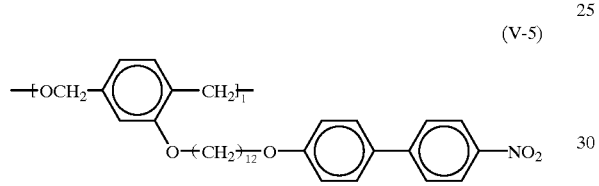

(V-5)

<Example 18>

A polymer was synthesized by the same method as Example 17, except that the compounds (XI-6) and (XIII-6), produced by Examples 11 and 12, respectively, were used. According to the result of the GPC analysis for the synthesized polymer, it was identified as a polymer expressed by the following formula (V-6), whose weight-average molecular weight ($M_w$) is 43,000 and polydispersity ($M_w/M_n$) is 2.5.

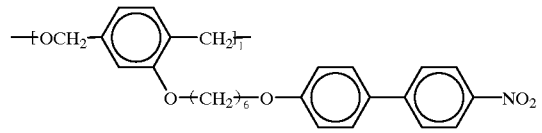

(V-6)

<Example 19>

0.02M of the compound (XIII-1) produced by Example 2 and 0.02M of ethyleneglycol were dissolved in 100 ml of o-dichlorobenzene, and 200 ml of 10N sodium hydroxide solution and 0.001M tetrabutylammoniumhydroxide were added, and then reacted for 24 hours under reflux. After extracting the resultant product, the GPC analysis was performed. As a result, the resultant product was identified as a polymer expressed by the following formula (V-7), whose weight-average molecular weight ($M_w$) is 53,000 and polydispersity ($M_w/M_n$) is 3.1.

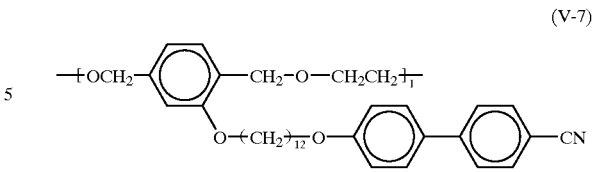

(V-7)

<Example 20>

A polymer was synthesized by the same method as Example 19, except that the compound (XIII-2) produced by Example 4 was used instead of the compound (XIII-1) produced by Example 2. According to the result of the GPC analysis for the synthesized polymer, it was identified as a polymer expressed by the following formula (V-8), whose weight-average molecular weight ($M_w$) is 35,000 and polydispersity ($M_w/M_n$) is 2.6.

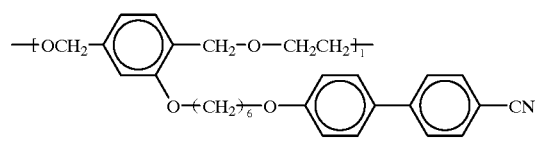

(V-8)

<Example 21>

0.02M of the compound (XIII-3) produced by Example 6 and 0.02M of ethylene glycol were dissolved in 100 ml of o-dichlorobenzene, and 200 ml of 10N sodium hydroxide solution and 0.001M tetrabutylammoniumhydroxysulfate were added, and then reacted for 24 hours under reflux. After extracting the resultant product, the GPC analysis was performed. As a result, the product was identified as a polymer expressed by the following formula (V-9), whose weight-average molecular weight ($M_w$) is 32,000 and polydispersity ($M_w/M_n$) is 2.9.

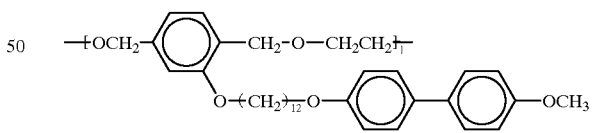

(V-9)

<Example 22>

A polymer was synthesized by the same method as Example 21, except that the compound (XIII-4) produced by Example 8 was used instead of the compound (XIII-3) produced by Example 6. According to the result of the GPC analysis for the synthesized polymer, it was identified as a polymer expressed by the following formula (V-10), whose weight-average molecular weight ($M_w$) is 43,000 and polydispersity ($M_w/M_n$) is 2.5.

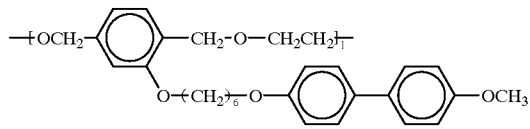
(V-10)

<Example 23>

0.02M of the compound (XIII-5) produced by Example 10 and 0.02M of ethyleneglycol were dissolved in 100 ml of o-dichlorobenzene, and 200 ml of 10N sodium hydroxide solution and 0.001M tetrabutylammoniumhydroxysulfate were added, and then reacted for 24 hours under reflux. By extracting the resultant product, the GPC analysis was performed. As a result, the product was identified as a polymer expressed by the following formula (V-11), whose weight-average molecular weight ($M_W$) is 45,000 and polydispersity ($M_W/M_n$) is 5.4.

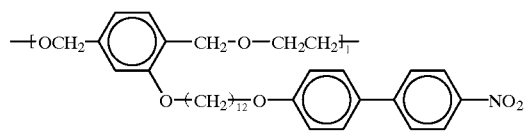
(V-11)

<Example 24>

A polymer was synthesized by the same method as Example 23, except that the compound (XIII-6) produced by Example 12 was used instead of the compound (XIII-5) produced by Example 10. According to the result of the GPC analysis for the synthesized polymer, it was identified as a polymer expressed by the following formula (V-12), whose weight-average molecular weight ($M_W$) is 37,000 and polydispersity ($M_W/M_n$) is 3.7.

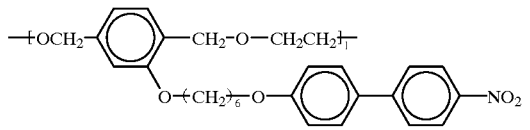
(V-12)

<Example 25>

0.02M of the compound (XI-1) produced by example 1, 0.02M of 1,4-dibromobutane (XIV-1) were dissolved in 200 ml of dichlorobenzene, and then reacted 12 hours under reflux condition. After cooling the reacted solution in refrigerator, the synthesized polymer was filtered and dried. According to the results of GPC analysis, the synthesized polymer was identified as a polymer expressed by the following formula (V-13), whose weight average molecular weight (Mw) is 32,000 and polydispersity (Mw/Mn) is 5.8.

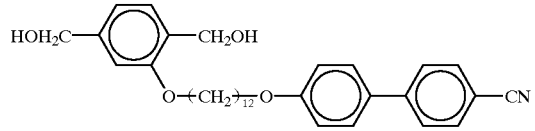
(XI-1)

BrCH₂CH₂CH₂CH₂Br (XIV-1)

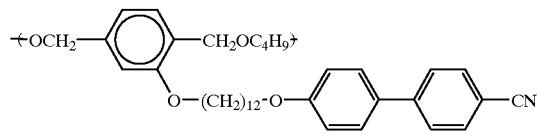
(V-13)

For the polymers produced by Examples 13~25, glass transition temperature (Tg), decomposition temperature (Tc) and solubility were measured, and the results are shown in Table 1. As can be seen from Table 1, the glass transition temperature and decomposition temperature were high, and the solubility was also excellent for all of the measured polymers obtained in Example 13 to 25.

EXAMPLES 26–27

Preparation of Optical Recording Medium

<Example 26>

An aluminum was deposited in a vacuum condition on a polycarbonate substrate in 1.2 mm thickness, the polycarbonate substrate having pregrooves of 170 nm depth, 0.07 μm width and 1.6 μm track pitch, to form a conductive layer of 10 nm thickness. 0.09 g of the polymer synthesized in Example 14 and 0.0005 g of chroconium dye (NK2772 which was made by Nippon Kagaku Shikijo Industrial) were dissolved in 10 ml of diacetone alcohol. Then, the resultant solution was spin-coated (at 2000 rpm) on the conductive layer, to form a recording layer. Here, the thickness of the recording layer on the pregrooves, measured by SEM, was approximately 2,500 Å. A corona falling process was performed to align the recording layer while heating the substrate to 105° C. Here, applied voltage was maintained at 12 kV during the poling process. Aluminum was deposited in a vacuum condition on the recording layer to form a reflective layer having 1,000 Å of thickness. Lastly, a protective layer of 7 μm thickness was formed using epoxyacrylate UV-curable resin, thereby completing an optical disk.

The reflectivity of the manufactured optical disk was good at 72%. Also, information was recorded on the manufactured optical disk at 1.3 m/sec recording speed using 8mW recording power of laser beam (λ=780 nm) and 720 kHz modulation. After recording, recorded information was reproduced under the same condition as recording, except that 0.7 mW of laser beam was irradiated. Here, carrier-to-noise ratio (C/N ratio) was 51 dB.

<Example 27>

Figure 5:
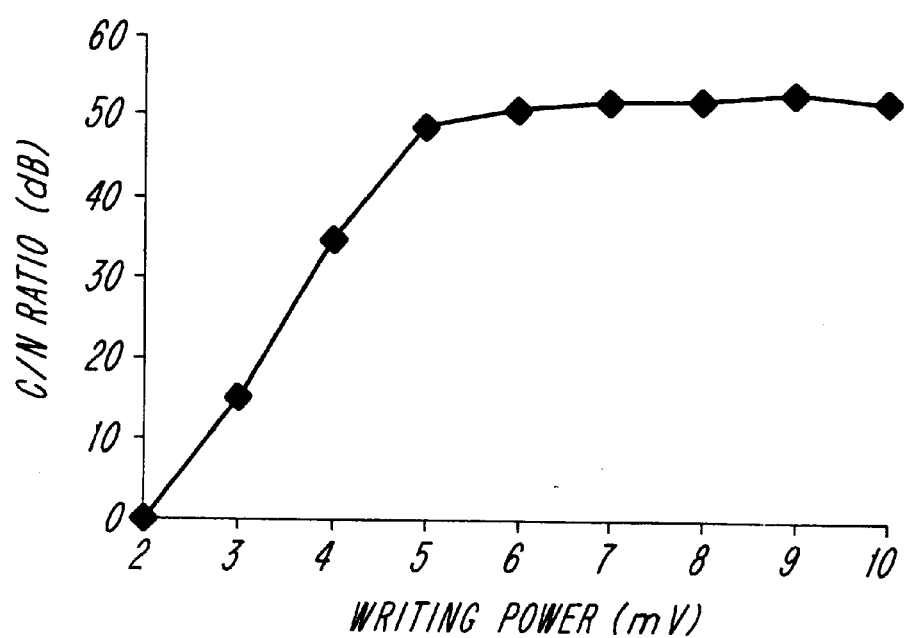
FIG. 5 is a graph of the resultant C/N ratio versus writing power in millivolts in accordance with Example 27.

Recording and playback were performed on the optical disk by the same method as that of Example 26, except of the level of the recording power. The resultant C/N ratio is shown in FIG. 5. As shown in FIG. 5, it can be seen that the C/N ratio of the optical disk of the present invention was 47 dB or more when 4mW or more recording power is used.

On the other hand, music was recorded on the optical disc manufactured by Example 26, using a compact disk recorder (RPD-1000, Pioneer). Then, the recorded music was reproduced by a compact disk player (Mark II, Philips). Therefore, the polymer manufactured according to the present invention can be adopted for a recording layer of an optical recording medium.

TABLE 1

| polymer | structural characteristics | | | physical characteristics | | | | |
|---|---|---|---|---|---|---|---|---|
| | A | n | R | Tg (°C.) | Tc (°C.) | $M_W$ | $M_W/M_n$ | solubility* |
| V-1 | $CH_2$ | 12 | CN | 72 | 184 | 23,000 | 2.7 | DAA, DMF |
| V-2 | $CH_2$ | 6 | CN | 73 | 155 | 32,000 | 2.7 | DAA, IPA, DMF |
| V-3 | $CH_2$ | 12 | $OCH_3$ | 63 | 150 | 32,000 | 8.5 | DAA, IPA, DMF |
| V-4 | $CH_2$ | 6 | $OCH_3$ | 59 | 160 | 25,000 | 3.1 | DAA, IPA, DMF |
| V-5 | $CH_2$ | 12 | $NO_2$ | 94 | 155 | 37,000 | 3.5 | DMF |
| V-6 | $CH_2$ | 6 | $NO_2$ | 82 | 180 | 43,000 | 2.5 | DAA, DMF |
| V-7 | $CH_2$-O-$CH_2CH_2$ | 12 | CN | 71 | 145 | 53,000 | 3.1 | DAA, IPA, DMF |
| V-8 | $CH_2$-O-$CH_2CH_2$ | 6 | CN | 63 | 172 | 35,000 | 2.6 | DAA, DMF |
| V-9 | $CH_2$-O-$CH_2CH_2$ | 12 | $OCH_3$ | 63 | 172 | 32,000 | 2.9 | DAA, DMF |
| V-10 | $CH_2$-O-$CH_2CH_2$ | 6 | $OCH_3$ | 53 | 164 | 43,000 | 2.5 | DAA, DMF |
| V-11 | $CH_2$-O-$CH_2CH_2$ | 12 | $NO_2$ | 82 | 143 | 45,000 | 5.4 | DAA, DMF |
| V-12 | $CH_2$-O-$CH_2CH_2$ | 6 | $NO_2$ | 72 | 154 | 37,000 | 3.7 | DAA, DMF |
| V-13 | $CH_2$-O-$C_4H_9$ | 12 | CN | 61 | 163 | 35,000 | 5.8 | DAA, DMF |

*The solubility is expressed by a solvent capable of dissolving the polymer, wherein IPA (isopropyl alcohol), DAA (diacetonalcohol) and DMF (dimethylformamide) represent the solvents.

As can be seen from Table 1, the polymer according to the present invention can easily be applied to the recording layer of an optical recording medium due to its excellent solubility. Also, due to its high glass transition temperature and low polydispersity, information recorded on a recording layer made of the polymer can be preserved for a long time. In addition, since the recorded type (pit) is even, the error rate is low and the occurrence of jitter noise can be remarkably reduced.

What is claimed is:

1. A side chain liquid crystal polymer expressed by the following formula (V):

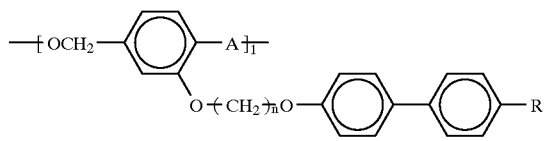

(V)

where A is $CH_2$ or $CH_2$—O—$(CH_2)_m$, R is $OCH_3$, CN or $NO_2$, l is 10 to 100, m is 1 to 6, and n is 1 to 20.

2. The side chain liquid crystal polymer of claim 1, wherein a weight-average molecular weight is 3,000~100,000.

3. The side chain liquid crystal polymer of claim 1, wherein l is 10 to 30.

4. The side chain liquid crystal polymer of claim 1, wherein a polydispersity of the polymer is 2~10.

5. A method for manufacturing a side chain liquid crystal polymer expressed by the following formula (V) comprising a reaction of a monomer compound expressed by the following formula (XI) and a compound expressed by the following formula (XIV):

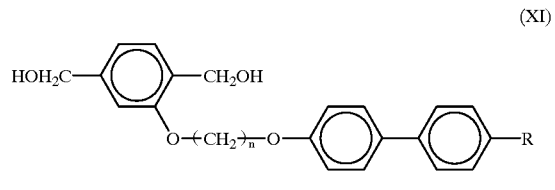

(XI)

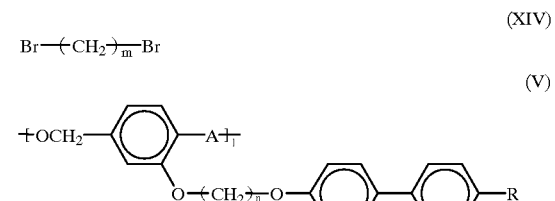

(XIV)

(V)

where A is $CH_2$ or $CH_2$—O—$(CH_2)_m$, R is $OCH_3$, CN or $NO_2$, l is 10 to 100, m is 1 to 6, and n is 1 to 20.

6. The method of claim 5, wherein a weight-average molecular weight of said side chain liquid crystal polymer is 3,000~100,000.

7. The method of claim 5, wherein l is 10 to 30.

8. The method of claim 5, wherein polydispersity of the liquid crystal polymer (V) is 2~10.

9. A method for manufacturing a side chain liquid crystal polymer expressed by the following formula (V) comprising a reaction of a monomer compounds expressed by the following formulae (XI) and (XIII):

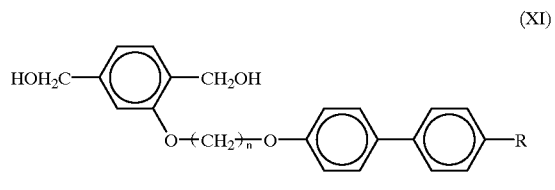

(XI)

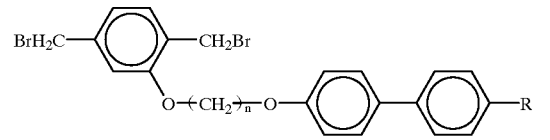

(XIII)

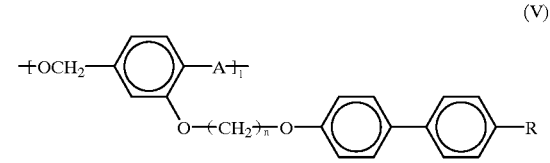

(V)

where A is $CH_2$ or $CH_2$—O—$(CH_2)_m$, R is $OCH_3$, CN or $NO_2$, l is 10 to 100, m is 1 to 6, and n is 1 to 20.

10. The method of claim 9, wherein a weight-average molecular weight of said side chain liquid crystal polymer is 3,000~100,000.

11. The method of claim 9, wherein l is 10 to 30.

12. The method of claim 9, wherein polydispersity of the liquid crystal polymer (V) is 2~10.

13. A method for manufacturing a side chain liquid crystal polymer expressed by the following formula (V) comprising a reaction of a monomer compound expressed by the following formula (XIII) and a monomer compound expressed by the following formula (XV):

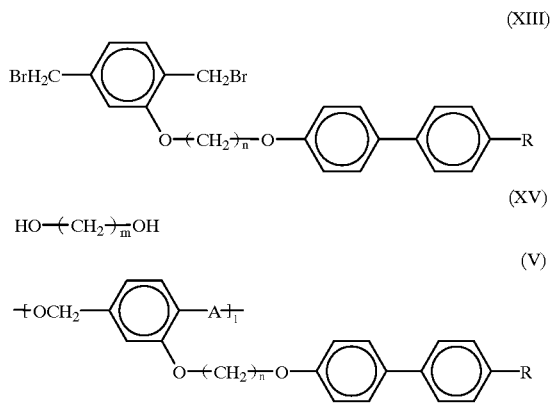

where A is $CH_2$ or $CH_2$—O—$(CH_2)_m$, R is $OCH_3$, CN or $NO_2$, l is 10 to 100, m is 1 to 6, and n is 1 to 20.

14. The method of claim 13, wherein a weight-average molecular weight of said side chain liquid crystal polymer is 3,000~100,000.

15. The method of claim 13, wherein l is 10 to 30.

16. The method of claim 13, wherein polydispersity of the liquid crystal polymer (V) is 2~10.

17. An optical recording medium in which a conductive layer, a recording layer, a reflective layer and a protective layer are sequentially formed on a transparent substrate, wherein the recording layer includes a side chain liquid crystal polymer and a dichroic dye, the side chain liquid crystal polymer expressed by the following formula (V):

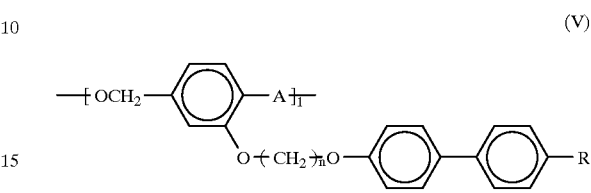

where A is $CH_2$ or $CH_2$—O—$(CH_2)_m$, R is $OCH_3$, CN or $NO_2$, l is 10 to 100, m is 1 to 6, and n is 1 to 20.

18. The optical recording medium of claim 17, wherein a weight-average molecular weight of said side chain liquid crystal polymer is 3,000~100,000.

19. The optical recording medium of claim 17, wherein l is 10 to 30.

20. The optical recording medium of claim 17, wherein a polydispersity of the polymer (V) is 2~10.

21. The optical recording medium of claim 13, wherein the ratio of the side chain liquid crystal polymer and the dichroic dye is 99.5:0.5~80.0:20.0 based on weight.

* * * * *